May 30, 1967   R. NEUSCHOTZ   3,322,005
TOOL FOR INSTALLING EXPANDABLE THREADED ELEMENT
Filed Sept. 21, 1965   2 Sheets-Sheet 1
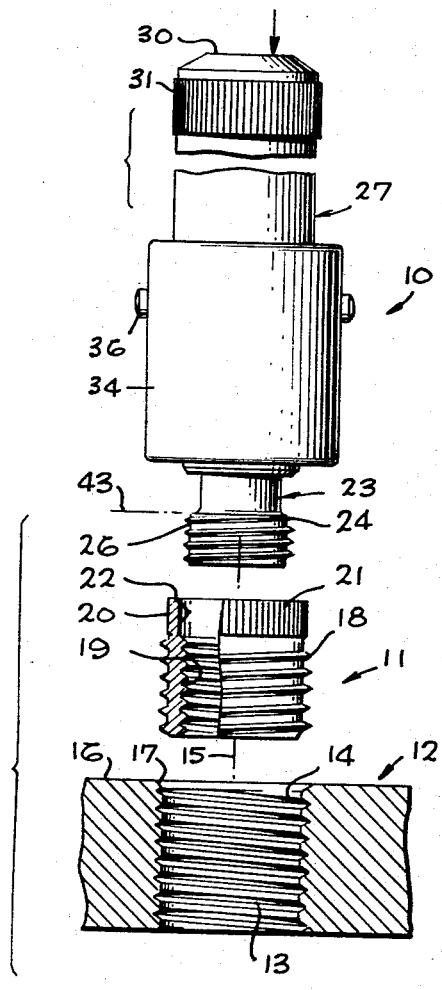
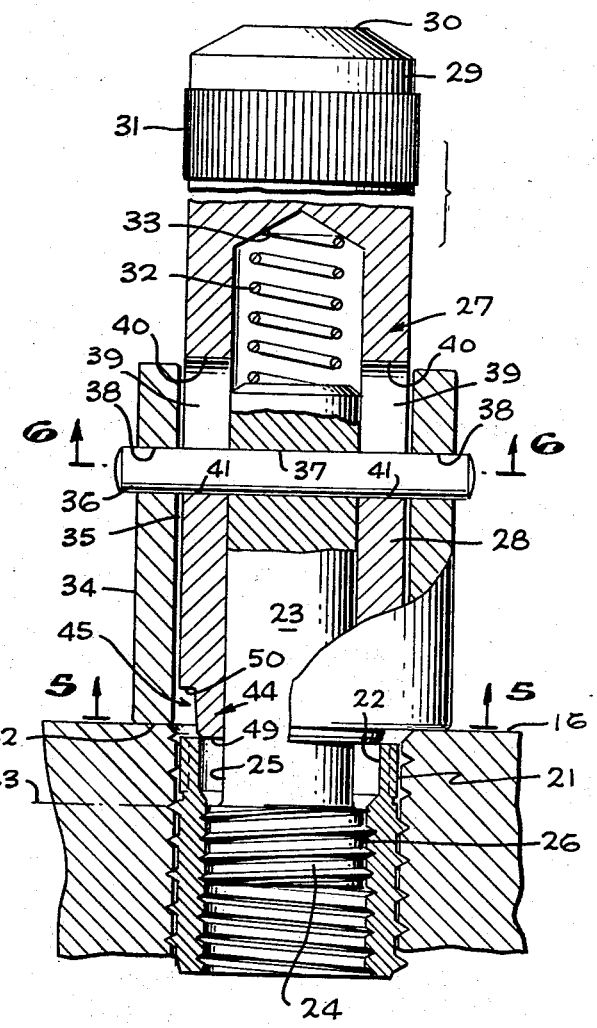
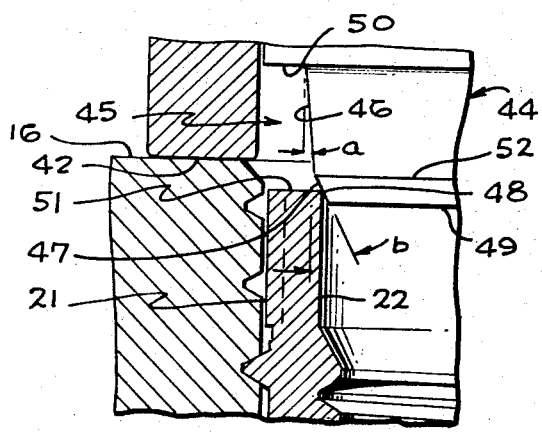
ROBERT NEUSCHOTZ
INVENTOR.
BY William P. Green
ATTORNEY May 30, 1967 R. NEUSCHOTZ 3,322,005
TOOL FOR INSTALLING EXPANDABLE THREADED ELEMENT
Filed Sept. 21, 1965 2 Sheets-Sheet 2
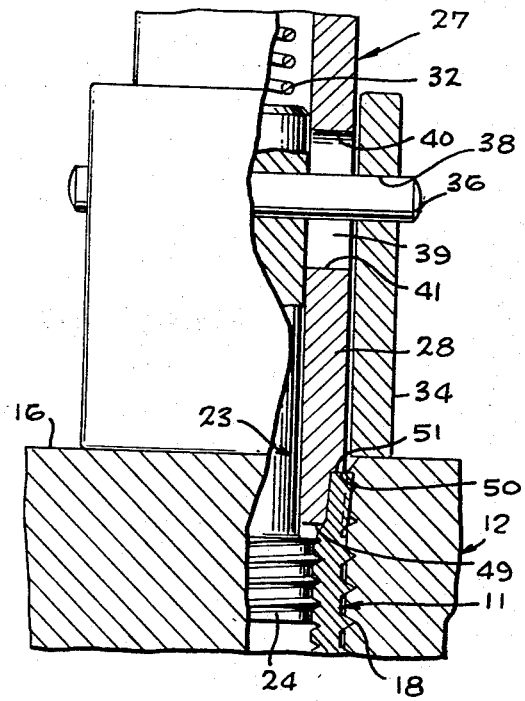
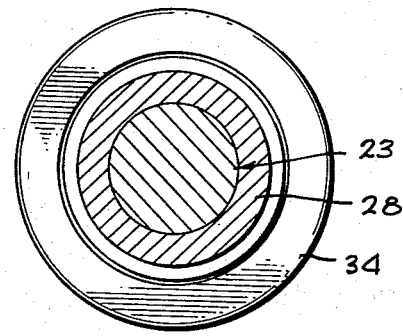
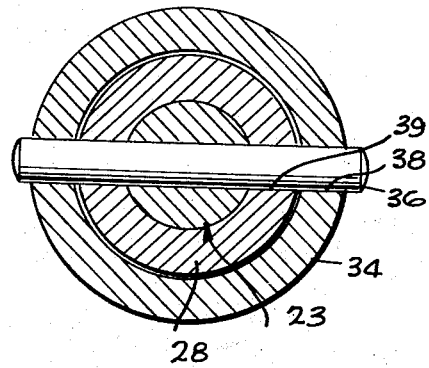
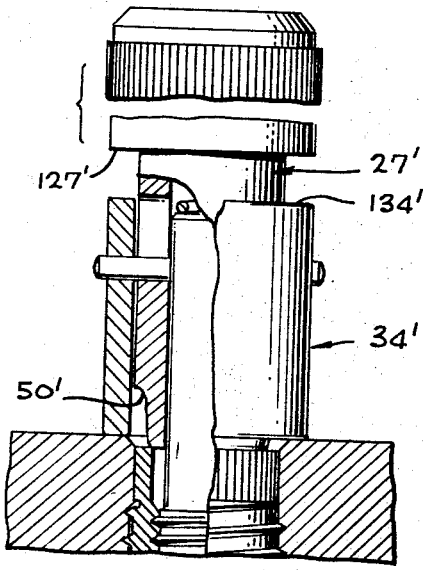
ROBERT NEUSCHOTZ
INVENTOR.
BY William P. Green
ATTORNEY

United States Patent Office 3,322,005
Patented May 30, 1967

3,322,005
TOOL FOR INSTALLING EXPANDABLE
THREADED ELEMENT
Robert Neuschotz, 1162 Angelo Drive,
Beverly Hills, Calif. 90210
Filed Sept. 21, 1965, Ser. No. 489,027
16 Claims. (Cl. 81—3)

This invention relates to improved tools for installing threaded elements of a type having a locking portion which is displaceable relative to, preferably expansible outwardly against, a carrier part within which the element is received, to lock the element against unscrewing rotation relative to and from the carrier part. Certain features of the tools shown in the present application are disclosed and claimed in my copending application filed of even date entitled, "Tool for Expanding Threaded Insert."

The threaded elements with which the present invention is concerned may be of a type having an essentially annular or tubular locking portion, with serrations or other irregularities being formed on its outer surface, and with an inner surface being provided against which the tool may exert a radially outward force for expanding the wall of the locking portion outwardly so that the serrations bite into the material of the carrier part and thus lock the element against unscrewing rotation. The element may be a tubular insert, having external threads for engaging a screw to connect the screw to the carrier part through the medium of the insert. It is also contemplated that the element may in some instances be a stud, in which both of two sets of threads are external.

An object of the invention is to provide a tool which is capable of displacing the locking portion of a threaded element to its locking condition in a very positive and accurately controllable manner, and yet with a simplicity of manipulation enabling installation of a series of the elements very rapidly and with little elapsed time. As will appear, a single tool embodying the invention is capable or first screwing the element into the carrier part to a desired installed position, and then displacing and preferably expanding the locking portion of the element against the carrier part and to its locked condition, following which the tool may be removed from the element with the entire installation procedure thus completed. A particular object of the invention is to so design a tool of this character as to accurately predetermine the depth to which the element is screwed by the tool into the carrier part, preferably with the element being advanced to a location at which its outer surface is inset slightly beneath or axially inwardly of the outer surface of the carrier part. The element is set at this position by merely turning the tool until a stop surface halts the rotation of the element into the carrier part, in the predetermined desired setting, following which the tool is actuated to displace the locking portion and thereby permanently retain the insert in the carrier part.

Structurally, a tool constructed in accordance with the invention includes a first section having mounting threads by which the element to be installed is threadedly connectible to this first section, so that rotation of the tool will act to screw the elements into the carrier part. In addition, the tool includes a second section which is mounted for axial movement relative to the carrier part, after the element has reached its predetermined set position in the carrier part, and which acts upon such axial movement to displace the locking portion of the element to its locked condition. Preferably, the second section has an expansion portion which is essentially annular, and has an outer essentially annular surface engageable with the tubular locking portion to expand it annularly outwardly against the carrier part.

Besides the discussed first and second sections, there may be provided a third section having a stop surface acting to engage the carrier part in a manner limiting advancement of the element thereinto. This third section may be connected to the first section in fixed axial position relative thereto, with the second section being movable axially relative to both of the other two sections during a setting or locking operation.

The above and other features and objects of the invention will be better understood from the following detailed description of the typical embodiments illustrated in the accompanying drawings, in which:

FIG. 1 is an exploded side view of a tool embodying the invention, together with an insert to be installed by the tool, and a carrier part into which the insert is to be screwed;

FIG. 2 is an enlarged axial section through the tool of FIG. 1, and showing the insert installed within the carrier part prior to the expanding operation;

FIG. 3 is a greatly enlarged fragmentary showing of a portion of FIG. 2;

FIG. 4 is a view similar to FIG. 2, but showing the tool and insert after the expanding operation;

FIGS. 5 and 6 are transverse sections taken on lines 5—5 and 6—6 respectively of FIG. 2; and FIG. 7 is a view similar to FIG. 2, but showing a variational tool having a second type of stop shoulder for limiting movement of the expander portion of the tool.

In FIG. 1, I have shown a tool embodying the invention at 10, which tool is to be utilized for installing an insert 11 within a carrier part 12. The carrier part contains a passage 13 having internal threads 14 extending along an axis 15 which is perpendicular to the planar upper surface 16 of the carrier part. A short countersink 17 may be provided at the upper end of the threaded passage 14. Insert 11 may typically be of the type shown in my copending application Ser. No. 402,379, filed Oct. 8, 1964, on "Theaded Insert Having Expandable Serrated Locking portion." More particularly, this insert may be essentially tubular, and have external threads 18 dimensioned to screw into and mate closely with internal threads 14 of the carrier part. The insert may also have a second set of threads for engaging another member, with this second set of threads being illustrated in FIG. 1 as internal threads 19 for receiving an externally threaded screw (not shown). The upper end of the tubular body of insert 11 has a tubular or annular locking portion 20, having external desirably axially extending serrations 21 on its outer surface, and containing an internal typically directly axial and cylindrical counterbore 22. All of the threads, serrations and counterbore of element 11 may of course be centered about the discussed axis 15. Serrations 21 are dimensioned to initially be received entirely within the minor diameter of carrier part threads 14, so that the element may be screwed into the carrier part to the position illustrated in FIG. 2 without interference being offered by the serrations, and in which position the serrations are located radially inwardly of and opposite the upper turns of the carrier part threads 14. To lock the insert within the carrier part, locking portion 20 is expansible annularly radially outwardly against the threads, so that the serrations bite into the threads and prevent unscrewing rotation of the element.

Referring now to FIG. 2, the tool 10 includes a first section 23 which is elongated along and centered about axis 15, and has external threads 24 formed at its lower end and dimensioned and shaped to screw into and interfit closely with internal threads 19 of the insert. If element 11 is a stud type device, in which a second set of threads serving the purpose of threads 19 are external in character, then the threads 24 of element 23 are correspondingly made internal to properly engage that second set of threads of the element 11.

Threads 24 are of course centered about main axis 15 of the apparatus, with element 23 having a reduced diameter externally cylindrical portion 25 upwardly beyond threads 24. This portion 25 preferably has a diameter which is smaller than the minor diameter 26 of threads 24, as will be apparent from FIG. 2.

A second section 27 of the tool 10 has a tubular portion 28 which is externally and internally cylindrical, and which is a close fit about outer surface 25 of section 23 to guide section 27 for only axial sliding movement relative to section 23, and along axis 15. At its upper end, section 27 has a portion 29 presenting an upper transverse surface 30 adapted to be contacted by a hammer to drive section 27 downwardly or axially inwardly relative to section 23. Externally, the upper portion of section 27 has a series of axially extending circularly spaced serrations 31, by which section 27 may be gripped to manually turn the entire tool about axis 15. A compression coil spring 32 contained within section 27 bears downwardly against the upper end of section 23, and upwardly against a generally transverse shoulder 33 formed in section 27, to yieldingly urge section 27 upwardly to the FIG. 2 position relative to section 23, and yieldingly resist downward movement of section 27.

About section 27, there is a third section designated 34 in FIG. 2, which section is tubular and is internally and externally cylindrical, and slidably engages the outer cylindrical surface of section 27 at 35 in a manner guiding section 27 for only axial movement relative to section 34, and along axis 15. A typically cylindrical pin 36, extending transversely of and through axis 15, connects sections 23 and 34 rigidly together, so that neither may move relative to the other, and for this purpose extends through and is a pressed fit within registering apertures or passages 37 and 38 in the two interconnected sections. This pin also extends through axially elongated slots 39 formed in the side wall of tubular portion 28 of section 27, at two diametrically opposite locations, to transmit rotary motion between section 27 and the two interconnected sections 23 and 34, and to also limit relative axial movement of the sections at the positions in which pin 36 engages end shoulders 40 and 41 of the slots.

The axially inner end surface 42 of section 34 may be annular and planar and disposed directly transversely of axis 15, to engage outer surface 16 of the carrier part, at a location closely adjacent threaded passage 13, in the FIG. 2 position of the tool. The plane 43 at which threads 24 of the tool terminate axially outwardly is desirably spaced axially inwardly a substantial distance from and beyond end surface 42 of section 34.

The inner extremity of section 27 of the tool forms an expander portion 44 of the device, having an outer annular expansion surface 45 for engaging and expanding outwardly the locking portion 20 of element 11. Surface 45 has a first portion 46 which extends approximately axially, and is centered about axis 15, and which terminates axially inwardly at a second portion 47 of surface 45 which tapers more abruptly radially inwardly as it advances axially. Preferably, portion 46 of surface 45 also tapers toward the axis, but at a very slight angle a (FIG. 3), which may desirably be between about one and ten degrees, for best results between about two and five degrees. Both of the surfaces 46 and 47 may be frustroconical. Surface 47 preferably tapers at an angle b between about twenty and forty-five degrees, desirably approximately thirty degrees. As will be apparent from FIG. 3, surface 47 is dimensioned and positioned to engage the upper edge 48 of counter bore 22 of the insert, in the unexpanded initial condition of the insert. Beneath surface 47, the expander portion 45 may have a transverse bottom surface 49. At the upper end of portion 46 of surface 45, section 27 may have an annular transverse shoulder 50 which is engageable downwardly against the upper transverse annular end surface 51 of the insert to limit the expansion operation. It is also noted that expander portion 44 is preferably located directly above, that is, directly axially opposite and in axial alignment with threads 24 of section 23, in order to be properly positioned for expansion of the locking portion of the insert.

In using the tool of FIGS. 1 to 6, the first step is to screw insert 11 onto the threads 24 formed at the lower end of section 23 of the tool. This insert is manually screwed onto the threads 24 to the position illustrated in FIGS. 2 and 3, in which the tapered surface portion 47 of the tool engages the edge formed at 48 on the insert at the upper end of the counterbore. With the insert thus connected to the tool, a user may manipulate the tool by grasping serrated portion 31 of section 27, and so locating the tool as to align the insert with threaded passage 13 of the carrier part, following which the tool is turned by means of serrations 31 to screw the insert into the carrier part. This advancement of the insert into the carrier part is continued until stop surface 42 of section 34 contacts surface 16 of the carrier part, to halt the advancing rotation of the insert at the accurately predetermined setting of FIG. 2, in which the upper end of the insert is inset very slightly beneath the outer surface of the carrier part. With the apparatus in this FIG. 2 condition, the user strikes one or more downward or axially inward blows against surface 30 of tool section 27, to thereby drive that section axially inwardly or downwardly from the position of FIGS. 2 and 3 to the position of FIG. 4. During such downward motion, surface portion 47 cams locking portion 20 of the insert radially outwardly, followed by slight additional outward expansion of that locking portion by the slightly tapered upper portion 46 of surface 47, so that serrations 21 on the outer surface of locking portion 20 are forced outwardly into the surrounding threads of the carrier part, to bite into those threads in a manner forming a positive lock against unscrewing rotation of the insert. When section 27 reaches its FIG. 4 setting, further downward motion of section 27 is prevented by engagement of stop shoulder 50 of that section with the upper end surface 51 of the insert. When the force is released, spring 32 retracts section 27 upwardly as permitted by the taper of both portions 46 and 47 of expander surface 45, following which the tool may be turned in the left-hand direction to unscrew section 23 from the installed insert.

In accordance with the teachings of my previously mentioned copending application entitled "Tool For Expanding Threaded Insert" the two portions 46 and 47 of expander surface 45 preferably meet at an edge 52 which extends circularly about axis 15, and at which the angle of taper of surface 45, as viewed in axial cross section, changes abruptly from the taper angle of portion 46 to the taper angle of portion 47. Stated differently, it is preferred that the edge 52, as viewed in axial section, be non-rounded, or at least substantially non-rounded. As discussed in my mentioned copending application, this abrupt change in direction of surface 45 at edge 52, without substantial rounding of that edge, effectively localizes the depth to which the locking portion of the insert is expanded, so that that depth may be accurately predetermined, and the resulting locking action may be reliably controlled. Also, the two abruptly meeting tapered surfaces are easier to form on the device than would be a conventional rounded flaring surface.

FIG. 7 shows a slightly variational form of the invention which may be considered as identical with that of FIGS. 1 to 6 except for the manner in which the downward expanding motion of section 27' is halted. Specifically, this motion is halted by engagement of a transverse annular shoulder 127' on section 27' with the upper transverse end surface 134' of section 34'. These shoulders are so located relative to one another as to halt the downward motion of section 27' at a position corresponding exactly to that illustrated in FIG. 4. In this second form of the invention, a shoulder corresponding to that shown at 50 in FIG. 3 may also be utilized for assisting in stopping the downward motion of section 27', or section 27' may be cut away annularly as illustrated at 50' in FIG. 7 to avoid contact at this location with the end of the insert.

I claim:

1. A tool for installing in a carrier part an element having first threads for engaging said carrier part and having second threads for engaging another member, said element having a generally tubular radially expansible locking portion with external irregularities to be expanded against the material of the carrier part and with an inner essentially annular tool engaging surface, said tool comprising a first tool section having mounting threads engageable with said second threads to connect the tool to the element so that the tool may screw the element into said carrier part, means forming a stop shoulder constructed and positioned to engage the carrier part and limit advancement of the first section relative thereto to determine the depth of advancement of the element into the carrier part, and a second tool section adapted to be driven along an axis relative to said first section and said stop shoulder, while said mounting threads are connected to said second threads, said second section having a generally annular expansion portion with an outer essentially annular surface which is positioned and constructed to engage the interior of said tubular locking portion essentially annularly and expand said locking portion radially outwardly upon and by virtue of said axial movement of said second section, said stop shoulder being disposed radially outwardly of said second section to engage the carrier part radially outwardly of said element.

2. A tool as recited in claim 1, in which said second threads of said element are internal and said engaging mounting threads of said first tool section are external, said first section having a shank of reduced external size axially outwardly of said external mounting threads and smaller in diameter than said mounting threads, said second section being disposed about and movable axially along said reduced shank of the first section.

3. A tool as recited in claim 2, in which said means forming said stop shoulder include a generally tubular third section disposed about said second section and connected to said first section for movement therewith.

4. A tool as recited in claim 3, in which said outer surface of said expansion portion of the second section has a first essentially annular portion extending approximately axially but tapering gradually as it advances axially inwardly, and a second essentially annular portion a the axially inner end of said first portion which tapers at an increased rate radially inwardly as it advances axially inwardly, said two surface portions meeting at an abrupt edge which extends annularly about said axis and at which the angle of taper changes abruptly without substantial rounding as viewed in axial cross section, said second section having an essentially annular and essentially transverse shoulder axially outwardly of said two portions of said outer surface of the expansion portion and radially inwardly of said first mentioned shoulder and engageable with said element to limit axially inward movement of said second section.

5. A tool as recited in claim 1, in which said second section has a generally transverse shoulder axially outwardly of and movable with said outer surface of said expansion portion and radially inwardly of said first mentioned shoulder and engageable against the axially outer end of said element to limit axially inward movement of said second section.

6. A tool as recited in claim 1, in which said outer surface of said expansion portion of the second section has a first essentially annular portion extending approximately axially and a second essentially annular portion at the axially inner end of said first portion which tapers at a substantial rate radially inwardly as it advances axially inwardly.

7. A tool as recited in claim 1, in which said means forming said stop shoulder include a generally tubular third section disposed about said second section and connected to said first section for movement therewith.

8. A tool as recited in claim 1, in which said outer surface of said expansion portion of the second section has a first essentially annular portion extending approximately axially but tapering gradually as it advances axially inwardly, and a second essentially annular portion at the axially inner end of said first portion which tapers at an increased rate radially inwardly as it advances axially inwardly, said two surface portions meeting at an abrupt edge which extends annularly about said axis and at which the angle of taper changes abruptly without substantial rounding as viewed in axial cross section.

9. A tool for installing within a carrier part an element having external first threads for engaging a carrier part and having internal second threads for engaging another member, said element having a generally tubular radially expansible locking portion with external irregularities to be expanded against the material of the carrier part in locking relation and with an inner essentially annular tool engaging surface, said tool comprising a first tool section having external mounting threads engageable with said second threads of the element to connect the element to the tool so that the tool may screw the element into said carrier part, said first section having a shank of reduced external size axially outwardly of and smaller in diameter than said mounting threads, and a second section adapted to be driven axially inwardly along an axis relative to said first section while said mounting threads are connected to said second threads, said second section having a generally annular expansion portion disposed about and movable axially along said reduced portion of the first section, said expansion portion having an outer essentially annular surface which is positioned and constructed to engage the interior of said tubular locking portion essentially annularly and expand said locking portion radially outwardly upon and by virtue of said axial movement of said second section.

10. A tool for installing in a carrier part a fastener unit having first threads for engaging said carrier part and having second threads for engaging another member and having a locking portion drivable to a locking position for retaining the fastener unit against removal from the carrier part; comprising a first section of the tool having mounting threads engageable with said second threads of the fastener unit in a relation connecting the fastener unit to the tool and rotatable about an axis to screw the unit into said carrier part, means forming a stop shoulder on the tool constructed and positioned to engage the carrier part and be retained by said engagement against axial advancement beyond a predetermined location and operatively connected to said first section in a relation positively blocking axial advancement of said first section beyond a predetermined position relative to said stop shoulder to thereby determine the depth to which the unit is screwed into the carrier part, and a second section of the tool adapted to then be driven along said axis relative to said first section and said stop shoulder, while said mounting threads are connected to said second threads of the fastener unit, and having a portion operable upon said axial movement to drive said locking portion of said unit to said locking position.

11. A tool as recited in claim 10, in which said shoulder is connected to said first section in fixed axial position relative thereto.

12. A tool for installing in a carrier part a fastener unit having first threads for engaging said carrier part and having second threads for engaging another member and having a locking portion drivable to a locking position for retaining the fastener unit against removal from the carrier part; comprising a first section of the tool having mounting threads engageable with said second threads of the fastener unit in a relation connecting the fastener unit to the tool and rotatable about an axis to screw the unit into said carrier part, means forming a stop shoulder on the tool constructed and positioned to engage the carrier part and to thereby determine the depth to which the unit is screwed into the carrier part, and a second section of the tool adapted to then be driven along said axis relative to said first section and said stop shoulder, while said mounting threads are connected to said second threads of the fastener unit, and having a portion operable upon said axial movement to drive said locking portion of said unit to said locking position, said portion of the second tool section defining a second shoulder engageable with said unit in a relation limiting the extent to which said unit may be initially screwed into engagement with said mounting threads to thereby accurately determine the axial position of said unit relative to said mounting threads during installation.

13. A tool for installing in a carrier part a fastener unit having first threads for engaging said carrier part and having second threads for engaging another member and having a locking portion drivable to a locking position for retaining the fastener unit against removal from the carrier part; comprising a first section of the tool having mounting threads engageable with said second threads of the fastener unit in a relation connecting the fastener unit to the tool and rotatable about an axis to screw the unit into said carrier part, means forming a stop shoulder on the tool constructed and positioned to engage the carrier part and to thereby determine the depth to which the unit is screwed into the carrier part, and a second section of the tool adapted to then be driven along said axis relative to said first section and said stop shoulder, while said mounting threads are connected to said second threads of the fastener unit, and having a portion operable upon said axial movement to drive said locking portion of said unit to said locking position, said portion of the second tool section defining a second shoulder engageable with said unit in a relation limiting the extent to which said unit may be initially screwed into engagement with said mounting threads to thereby accurately determine the axial position of said unit relative to said mounting threads during installation, said second section being disposed about said first section, said shoulder forming means being disposed about said second section and being connected to said first section in fixed axial position relative thereto and forming said shoulder radially outwardly of and about said section for engagement with the carrier part at a location about said unit.

14. A tool for installing in a carrier part a fastener unit having first threads for engaging said carrier part and having second threads for engaging another member and having a locking portion drivable to a locking position for retaining the fastener unit against removal from the carrier part; comprising a first section of the tool having mounting threads engageable with said second threads of the fastener unit in a relation connecting the fastener unit to the tool and rotatable about an axis to screw the unit into said carrier part, means forming a stop shoulder on the tool constructed and positioned to engage the carrier part and to thereby determine the depth to which the unit is screwed into the carrier part, and a second section of the tool adapted to then be driven along said axis relative to said first section and said stop shoulder, while said mounting threads are connected to said second threads of the fastener unit, and having a portion operable upon said axial movement to drive said locking portion of said unit to said locking position, said portion of the second tool section defining a second shoulder engageable with said unit in a relation limiting the extent to which said unit may be initially screwed into engagement with said mounting threads to thereby accurately determine the axial position of said unit relative to said mounting threads during installation, said second section being disposed about said first section, said shoulder forming means being disposed about said second section and being connected to said first section in fixed axial position relative thereto and forming said shoulder radially outwardly of and about said second section for engagement with the carrier part at a location about said unit, said second section defining a second shoulder near an axially inner end thereof engageable with said unit in a relationship limiting the extent to which said unit may be initially screwed into engagement with said mounting threads to thereby accurately determine the axial position of said unit relative to said mounting threads during installation, there being a spring yieldingly urging said second section axially outwardly relative to said first section and said first shoulder, and means for limiting said spring urged axially outward movement of said second section at a predetermined position relative to said first section.

15. A tool as recited in claim 10, in which said first section extends essentially along said axis and has said mounting threads formed thereon at one end of said first section, said second section having a tubular portion disposed about and movable axially relative to said first section, said shoulder forming means including an essentially tubular sleeve disposed about said second section and said first section and carrying said shoulder at an axially inner end of the sleeve, there being a pin extending essentially transversely of said axis and rigidly connected to and interconnecting said first section and said sleeve and extending through axially elongated slots in said tubular portion of the second section in a relation enabling limited relative axial movement of said second section.

16. A tool for installing in a carrier part a fastener unit having first threads for engaging said carrier part and having second threads for engaging another member and having a locking portion drivable to a locking position for retaining the fastener unit against removal from the the carrier part; comprising a first section of the tool having mounting threads engageable with said second threads of the fastener unit in a relation connecting the fastener unit to the tool and rotatable about an axis to screw the unit into said carrier part, means forming a stop shoulder on the tool constructed and positioned to engage the carrier part and limit advancement of the first section relative thereto by thereby determine the depth to which the unit is screwed into the carrier part, and a second section section of the tool adapted to then be driven along said axis relative to said first section and said stop shoulder, while said mounting threads are connected to said second threads of the fastener unit, and having a portion operable upon said axial movement to drive said locking portion of said unit to said locking position.

References Cited

UNITED STATES PATENTS 3,081,808    3/1963    Rosan et al.    151—41.73
3,139,675    7/1964    Devine et al.    29—240

OTHELL M. SIMPSON, *Primary Examiner.*